(12) United States Patent  (10) Patent No.: US 6,661,677 B1
Rumney  (45) Date of Patent: Dec. 9, 2003

(54) DISC DRIVE CAGE

(75) Inventor: Gary Rumney, Leighton Buzzard (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/217,157

(22) Filed: Aug. 12, 2002

(51) Int. Cl.$^7$ ................................................ H05K 9/00
(52) U.S. Cl. ...................... 361/818; 361/800; 361/816; 361/685; 174/35 R; 174/35 GC
(58) Field of Search ................................ 361/685, 736, 361/752, 800, 816, 818; 174/35 R, 35 GC, 35 MS, 50; 439/607

(56) References Cited

U.S. PATENT DOCUMENTS

| 5,226,828 | A | | 7/1993 | Fietz | |
|---|---|---|---|---|---|
| 5,510,955 | A | * | 4/1996 | Taesang | 361/685 |
| 5,564,804 | A | * | 10/1996 | Gonzalez et al. | 312/223.2 |
| 5,572,402 | A | | 11/1996 | Jeong | |
| 5,588,728 | A | * | 12/1996 | Eldridge et al. | 312/332.1 |
| 5,652,695 | A | * | 7/1997 | Schmitt | 361/685 |
| 5,673,171 | A | * | 9/1997 | Varghese et al. | 361/685 |
| 5,673,172 | A | * | 9/1997 | Hastings et al. | 361/685 |
| 5,726,864 | A | * | 3/1998 | Copeland et al. | 361/800 |
| 5,751,551 | A | | 5/1998 | Hileman et al. | |
| 5,940,265 | A | * | 8/1999 | Ho | 361/685 |
| 6,061,232 | A | | 5/2000 | Ho | |
| 6,067,225 | A | | 5/2000 | Reznikov et al. | |
| 6,088,222 | A | | 7/2000 | Schmitt et al. | |
| 6,185,097 | B1 | * | 2/2001 | Behl | 361/695 |
| 6,373,707 | B1 | | 4/2002 | Hutchins | |
| 6,421,236 | B1 | | 7/2002 | Montoya et al. | |

FOREIGN PATENT DOCUMENTS

| EP | 0713219 | 10/1999 |
|---|---|---|
| JP | 220464 | 8/1995 |
| JP | 348675 | 12/1999 |

\* cited by examiner

Primary Examiner—David Martin
Assistant Examiner—Dameon E. Levi
(74) Attorney, Agent, or Firm—Meyertons Hood Kivlin Kowert & Goetzel, P.C.; B. Noël Kivlin

(57) ABSTRACT

A component cage for detachable mounting an ancillary component such as a hard disc drive in a housing for an electronic circuit is described. The cage has internal step surfaces to engage support runners of the component. The formation of elongated slots in the cage to accommodate support runners is avoided, improving the electromagnetic shielding ability of the cage.

14 Claims, 3 Drawing Sheets

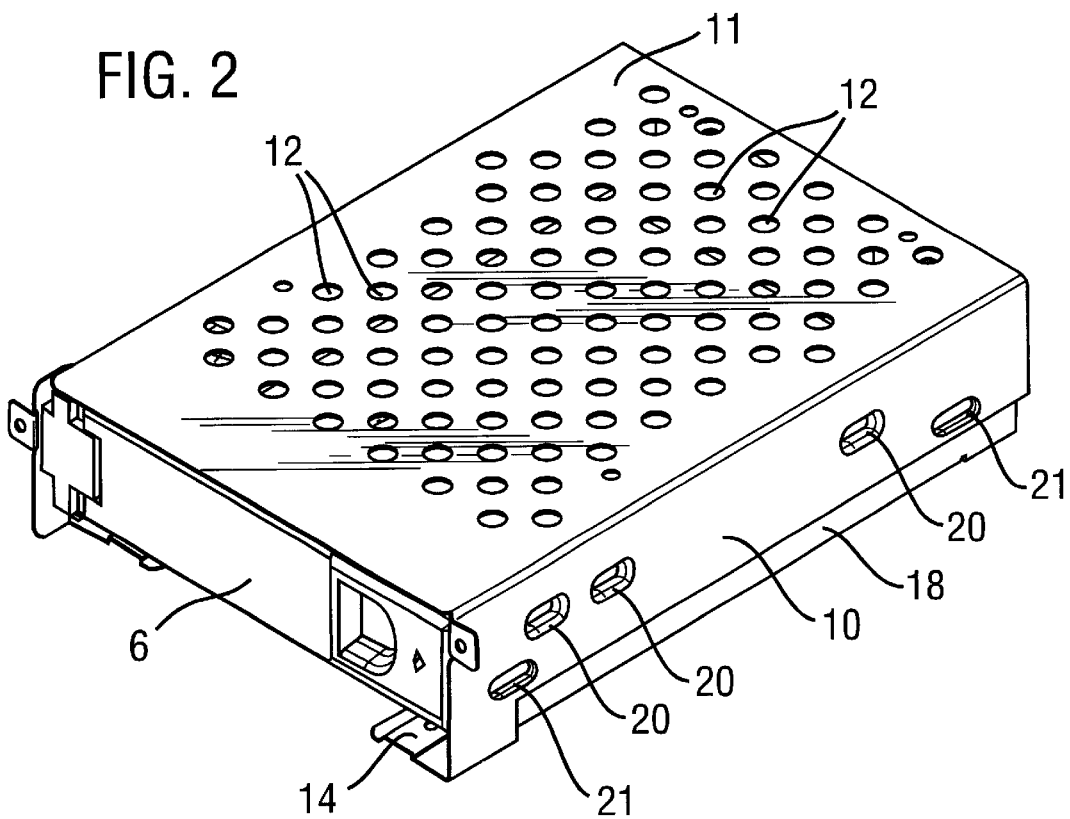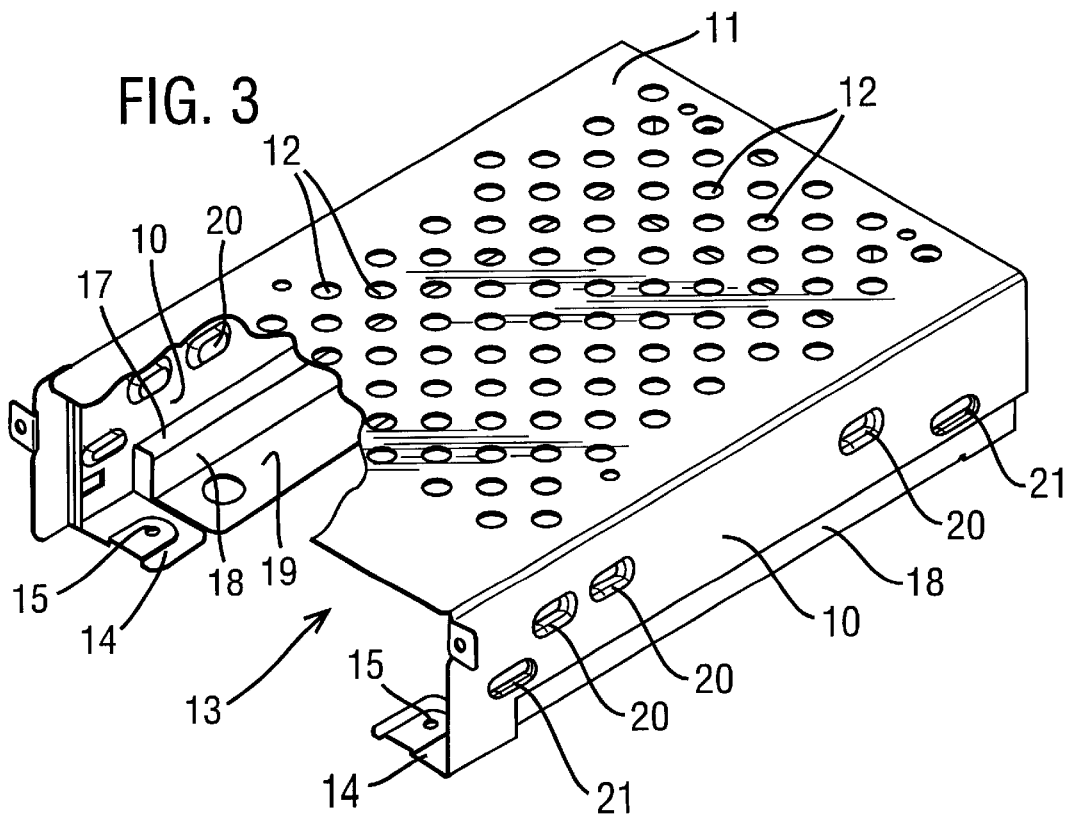

DISC DRIVE CAGE

BACKGROUND OF THE INVENTION

The present invention relates to housings for electronic equipment, and is particularly concerned with improving the electromagnetic shielding properties of cages or mounts for detachably mounting ancillary compartments such as disc drives in such housings.

In order to improve serviceability of electronic equipment using hard disc drives, it is conventional to mount the hard disc drive so that it is easily removable from the equipment. This is conventionally done by providing the hard disc drive with a pair of runners extending along opposite side surfaces of the hard disc drive unit, and providing in the equipment housing a cage to receive the hard disc drive unit wherein side faces of the cage are provided with slots into which the runners may be received and guided during insertion and removal of the hard disc drive from the cage.

The presence of these necessarily elongated slots in the sides of the hard disc drive cage significantly reduces the efficacy of the cage in respect of its electromagnetic shielding properties. The correlation between the frequencies which can pass through an opening in an electromagnetic shielding plate and the maximum dimension of that opening are such that, when elongated slots are provided in the hard disc drive cage, significant escapes of electromagnetic energy can take place through these slots.

When a hard disc drive is in place in the cage, the casing of the hard disc drive itself may go some way to closing the gap in the electromagnetic shielding, but when the disc drive is removed a significant gap in the electromagnetic shielding for the components within the circuit housing is opened.

SUMMARY OF THE INVENTION

An aspect of the present invention seeks to provide a hard disc drive cage with enhanced electromagnetic shielding. This aspect provides a component cage for detachably mounting an auxiliary component in a housing of an electronic circuit, wherein the component comprises a pair of supporting runners, the cage being formed from electromagnetic screening material and comprising:

an open front face;

a pair of parallel spaced sidewalls extending perpendicularly to the open front face;

a rear face extending between the sidewalls at their ends remote from the open face; and a transverse wall extending between the sidewalls perpendicularly to the plane of the open face, wherein the sidewalls are substantially continuous and are provided on their internal surfaces with a step surface for engaging a respective supporting runner of the component, the step surfaces extending in a plane parallel to the transverse wall and spaced therefrom.

A second aspect provides a circuit housing having a disc drive cage, and a third aspect provides a modular rack-mounted circuit having modules including the cage.

BRIEF DESCRIPTION OF THE DRAWINGS

Embodiments of the present invention will now be described in detail with reference to the accompanying drawings, in which corresponding parts are given like reference numbers. In the drawings:

FIG. 2 is a perspective view showing the hard disc drive inserted into the cage;

FIG. 3 is a cut-away perspective view showing interior detail of the hard disc drive cage;

DESCRIPTION OF PARTICULAR EMBODIMENTS

Figure 1:
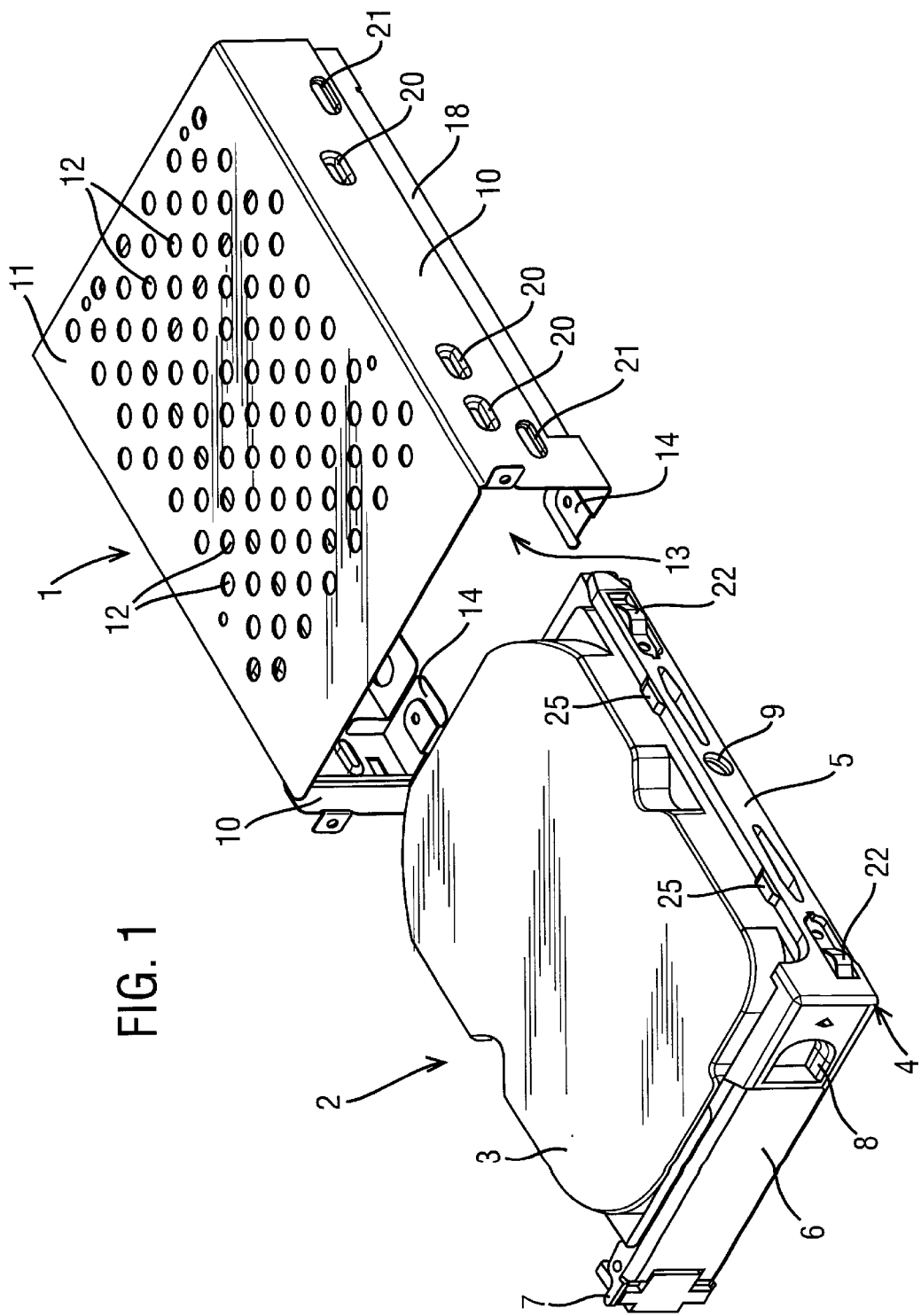
FIG. 1 is a perspective view of a hard disc drive unit and a hard disc drive cage according to the invention.
Figure 4:
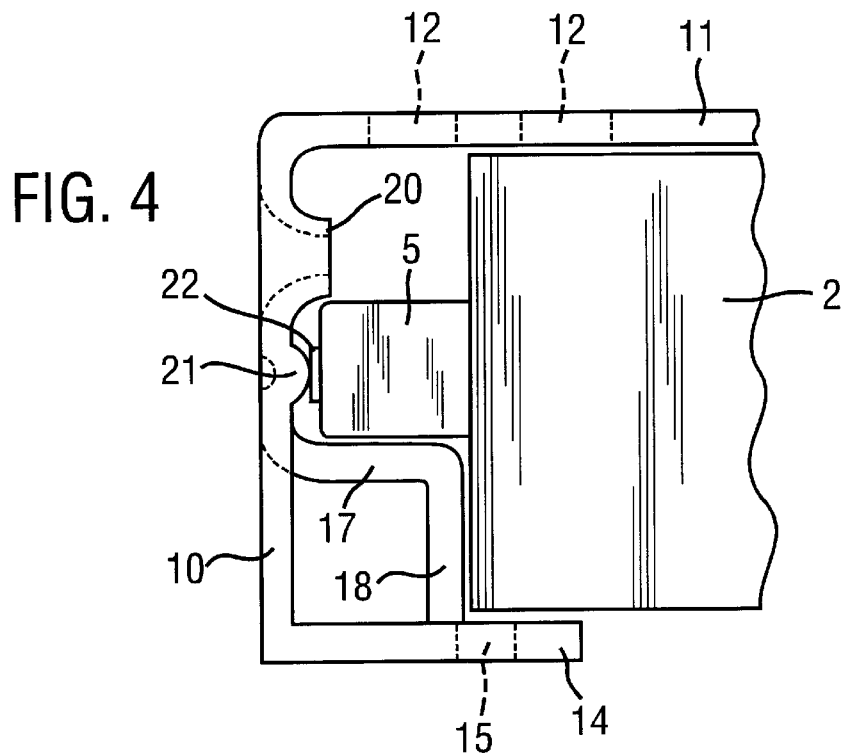
FIG. 4 is a front view, to an enlarged scale, showing the engagement of the hard disc drive with the hard disc drive cage.

Referring now to the drawings, in which like reference numerals are used to designate corresponding elements, FIG. 1 is a perspective view showing a hard disc drive cage 1 and a hard disc drive 2 positioned for insertion into the cage 1.

The hard disc drive 2 comprises a housing 3 and a mounting bracket 4 attached to the housing. The mounting bracket 4 comprises a pair of side runners 5 extending along the sides of the housing 3, and a cross-piece 6 which extends across the end of the housing 3 between the side runners 5. The cross piece 6 includes a release lever 7 and a finger recess 8, whose purposes will be described in detail later.

Hard disc drive manufacturers produce hard disc drives with housings 3 having standardised dimensions, and thus the mounting bracket 4 may be provided with attachment points such as bolt holes 9 for attaching the mounting bracket 4 to any available hard disc drive housing 3.

The disc drive cage 1 for receiving the disc drive 2 and mounting bracket 4 comprises a pair of sidewalls 10 and a perforated top 11 formed with an array of ventilation holes 12. The cage 1 is formed from a metallic sheet by performing bending, stamping or folding operations on a sheet metal blank. In the embodiment shown the cage 1 is formed from one millimetre thick zinc plated mild steel, but other metals such as aluminum may be used, for example, for weight reduction. As an alternative to metal sheet, the cage may be formed from plastics or composite material with a metallic coating on its inside or outside surface to provide electromagnetic shielding. In a yet further alternative, a plastics material with an embedded metallic layer or mesh may be used.

The ventilation holes 12 are circular, and of about 3 to 8 mm diameter. In the illustrated embodiment the largest dimension of any hole formed in the sheet metal of the cage is about 6 mm. To minimise electromagnetic leakage, all openings are made to be substantially circular or rounded. If the holes are too small, they present too great a resistance to air flow for effective cooling. If the holes are elongated, then their electromagnetic shielding effect is compromised. Circular holes of from about 5 to about 6 mm diameter have been found to be effective.

The hard disc drive cage 1 has an open front 13, through which the hard disc drive 2 and mounting bracket 4 are inserted.

The sidewalls 10, at their ends adjacent the open front 13, have inwardly-projecting feet 14 extending from their lower edges. The feet 14 are provided with openings 15 for fixing the cage 1 to a supporting structure or housing 16.

To the rear of the feet 14, the lower parts of each of the sidewalls 10 are bent to form an inwardly-extending step 17 which connects the sidewall 10 to a riser 18. The riser 18 extends vertically downwardly from the inner edge of the step 17, and from the lower edge of the riser 18 a base 19 extends inwardly. The base 19 is coplanar with the foot 14 and extends to the rear of the cage 1. The bases 19 and feet 14 of the respective sidewalls 10 may be extended to meet each other to form a bottom wall for the cage 1, in order completely to enclose the hard disc drive 2.

The rear face of the cage 1 is closed by a rear wall, optionally also provided with ventilation holes. The rear wall also provides a mounting for an electrical connection to the hard disc drive 2 when installed in the cage 1.

The cage 1 is so dimensioned that the side runners 5 of the mounting bracket 4 engage the steps 17 of the cage 1 with their undersurfaces as the hard disc drive 2 is inserted into the cage 1. The sidewalls 10 are provided with inwardly-embossed openings 20 spaced above the step 17 on each side, the embossments around the openings being engageable with the upper surfaces of the side runners 5 to retain them on the steps 17.

A further inward embossment 21 of the sidewalls 10 is provided at the mid height between the step 17 and the embossed openings 20, at the front and rear of the cage 1. The purpose of the embossments 21 is to provide an effective earth contact with earthing strips 22 provided on the outside faces of the side runners 5 of the mounting bracket 4. The embodiments 21 may therefore be provided at any suitable location to contact the earthing strips 22 when the disc drive is mounted within the cage.

Figure 5:
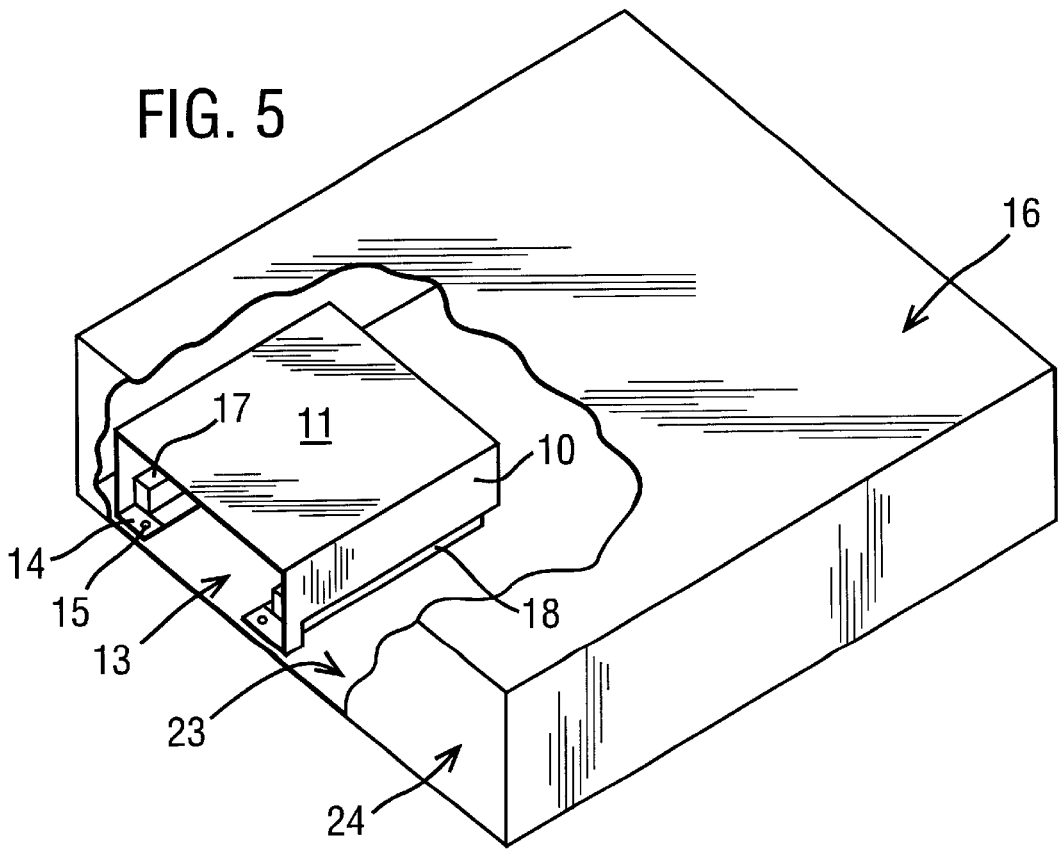
FIG. 5 is a schematic cut-away perspective view of a circuit housing incorporating the hard disc drive cage.

In the embodiment shown in FIG. 5, the cage 1 is attached to the base 23 of a housing 16, for example by the use of threaded fasteners such as screws extending through the mounting holes 15 in the feet 14 of the cage 1. The front face 24 of the housing 16 is provided with an opening corresponding in size to the open front face 13 of the cage 1, and through which a drive assembly comprising a hard disc drive 2 and a mounting bracket 4 may be inserted.

The drive is mounted to the cage by aligning the drive assembly and the cage as shown in FIG. 1, and moving the drive assembly into the cage so that the side runners 5 rest on the steps 17 of the sidewalls 10 of the cage 1. As the drive is pushed fully home into the cage 1, earthing strips 22 on the side runners 5 make firm engagement with the embossments 21 in the side walls 10, and the embossed openings in the sidewalls 10 engage the upper surface of the side runners 5. In the embodiment shown in FIG. 1, the upper surfaces of the side runners. 5 are provided with resilient detents 25 which are deflected downwardly as they pass beneath the embossed openings 20, and subsequently resiliently recover to secure the side runner 5 in its longitudinal direction. In the embodiment shown, the detent 25 adjacent the cross piece 6 is positioned between the two embossed openings 20 nearest the open front 13 of the cage 1, while the detent 25 remote from the cross piece 6 of the mounting bracket 4 is positioned behind the embossed opening 20 adjacent the rear face of the cage 1.

A connection such as a multi-pin plug or socket is mounted to a rear wall of the cage 1, and a mating connector positioned on the end surface of the hard drive housing 3 remote from the cross piece 6 engages with the connection of the cage 1 during the final insertion movement of the hard drive assembly.

To remove the hard drive assembly from the cage 1, an operator engages the finger recess 8 and pulls a release lever 7 away from the cross piece 6. This causes the release lever 7 to be pivoted about a vertical axis and engage a front edge of the side wall 10. The levering action then moves the hard drive assembly out of the cage 1 by an initial amount, resiliently compressing the detents 25 so that they pass beneath their respective embossed openings 20 and releasing the electrical connections at the rear face of the cage 1. Once an initial part of the removal movement is completed, the operator may grasp the housing 3 of the hard drive 2 in order to draw the hard drive assembly completely out of the cage 1.

The provision of the steps 17, risers 18 and bases 19 on the sidewalls 10 of the cage 1 ensures that the cage 1 can engage the side runners 5 of the mounting bracket 4 without the need to provide elongated slots in the sidewall 10 which compromise the electromagnetic shielding provided by the cage 1.

While the cage 1 has been described in relation to a mounting for a hard disc drive unit, it will be understood that any other removable assembly equipped with side runners may be used with a cage 1 according to the present invention. Alternative units such as floppy disc drives, card drives, or other ancillary devices may therefore be simply mounted and dismounted from an electronic circuit while conserving the integrity of the electromagnetic shielding provided for the circuit.

The embodiments described and shown in the drawings have an open underside to the cage, for mounting to a base. It is to be understood that the cage may be mounted in any convenient orientation, and the terms "upper" and "lower" "sides" etc. used in the description should not be construed as limiting to the orientations illustrated.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims can be formulated to such features during the prosecution of this application or of any such further application derived therefrom. In particular, with reference to the appended claims, features from dependent claims can be combined with those of the independent claims and features from respective independent claims can be combined in any appropriate manner and not merely in the specific combinations enumerated in the claims.

What is claimed is:

1. A component cage for detachably mounting an auxiliary component in a housing of an electronic circuit, wherein the component comprises a pair of supporting runners, the cage being formed from electromagnetic screening material and comprising:

an open front face;

a pair of parallel spaced sidewalls extending perpendicularly to the open front face;

a rear face extending between the sidewalls at their ends remote from the open face;

a transverse wall extending between the sidewalls perpendicularly to the plane of the open face, wherein the sidewalls are substantially continuous and are provided on their internal surfaces with a step surface for engaging a respective supporting runner of the component, the step surfaces extending in a plane parallel to the transverse wall and spaced therefrom; and wherein the sidewalls are formed with inwardly embossed projections spaced from the step surface so that the support runners are engageable between the step surfaces and the embossed projections.

2. A component cage according to claim 1, wherein each sidewall comprises a riser extending from an edge of the step remote from the sidewall.

3. A component cage according to claim 1, wherein the transverse wall or the rear wall are formed with ventilation openings.

4. A component cage according to claim 3, wherein the ventilation openings are circular.

5. A component cage according to claim 4, wherein the openings are from about 3 to about 8 mm in diameter.

6. A component cage according to claim 5, wherein the openings are from about 5 to about 5 mm in diameter.

7. A component cage according to claim 1, wherein the electromagnetic screening material is a metallic sheet material.

8. A component cage according to claim 5, formed by folding or stamping a sheet metal blank.

9. A component cage according to claim 1, wherein the electromagnetic screening material is a plastics material with a metallic layer thereon.

10. A component cage according to claim 1, wherein the electromagnetic screening material is a plastics material with a metallic mesh embedded therein.

11. A component cage according to claim 1, wherein the internal dimensions of the cage correspond to the external dimensions of a hard disc drive and mounting bracket.

12. A housing for an electronic circuit, comprising an enclosure having an opening for mounting a removable circuit component having a pair of supporting runners therethrough and a cage mounted within the housing in alignment with the opening to receive the component, the cage having a pair of internal step surfaces and respective inwardly embossed projections spaced from the step surfaces so that the support runners of the component are each engageable between a step surface and a projection.

13. A modular electronic circuit comprising a supporting rack and a number of circuit modules, wherein one of the circuit modules comprises a component cage comprising:

an open front face;

a pair of parallel spaced sidewalls extending perpendicularly to the open front face;

a rear face extending between the sidewalls at their ends remote from the open face;

transverse wall extending between the sidewalls perpendicularly to the plane of the open face, wherein the sidewalls are substantially continuous and are provided on their internal surfaces with a step surface for engaging a respective supporting runner of the component, the step surfaces extending in a plane parallel to the transverse wall and spaced therefrom; and wherein the sidewalls are formed with inwardly embossed projections spaced from the step surface so that the support runners are engageable between the step surfaces and the embossed projections.

14. A modular electronic circuit according to claim 13 wherein the component cage is a hard disc drive cage.

* * * * *

UNITED STATES PATENT AND TRADEMARK OFFICE
CERTIFICATE OF CORRECTION

PATENT NO. : 6,661,677 B1
DATED : December 9, 2003
INVENTOR(S) : Rumney

It is certified that error appears in the above-identified patent and that said Letters Patent is hereby corrected as shown below:

Column 6,
Line 14, please change "transverse wall" to -- a transverse wall --.

Signed and Sealed this

Fifteenth Day of June, 2004

JON W. DUDAS
*Acting Director of the United States Patent and Trademark Office*